US007760637B1

(12) United States Patent
Sridhar et al.

(10) Patent No.: US 7,760,637 B1
(45) Date of Patent: Jul. 20, 2010

(54) SYSTEM AND METHOD FOR IMPLEMENTING FLOW CONTROL WITH DYNAMIC LOAD BALANCING FOR SINGLE CHANNELIZED INPUT TO MULTIPLE OUTPUTS

(75) Inventors: Kamakshi Sridhar, Plano, TX (US); Gerardo A. Gonzalez, Plano, TX (US); James Talley, Frisco, TX (US); Donald P. Zriny, Lucas, TX (US)

(73) Assignee: Alcatel Lucent, Paris (FR)

( * ) Notice: Subject to any disclaimer, the term of this patent is extended or adjusted under 35 U.S.C. 154(b) by 1055 days.

(21) Appl. No.: 10/865,432

(22) Filed: Jun. 10, 2004

(51) Int. Cl.
*G08C 15/00* (2006.01)
*H04J 3/22* (2006.01)
(52) U.S. Cl. .................... 370/235; 370/543
(58) Field of Classification Search .......... 370/542, 370/543, 545, 235, 235.1, 229, 230.1
See application file for complete search history.

(56) References Cited

U.S. PATENT DOCUMENTS

| 4,621,359 | A * | 11/1986 | McMillen ............ 370/235 |
| 7,360,217 | B2 * | 4/2008 | Melvin et al. ......... 718/102 |
| 2003/0069920 | A1 * | 4/2003 | Melvin et al. ......... 709/108 |

OTHER PUBLICATIONS

"VSC7321 Meigs-II—10×1G and 10G Ethernet MAC Chip"; Vitesse; Ethernet Product VSC7321; 2002; 2 pages.

"System Packet Interface Level 4 (SPI-4) Phase 2"; Altera; 1995; 2 pages; http://www.altera.com/products/devices/stratixgx/features/sgx-spi.html.
"SPI-4.2 to Quad SPI-3 Pre-Architected ASIC Bus Bridge"; Flextronics Semiconductor; Version 2.1a; Preliminary Data Sheet; Jan. 9, 2003; 40 pages.
Cam, Richard et al.; "System Packet Interface Level 4 (SPI-4) Phase 2 Revision 1: OC-192 System Interface for Physical and Link Layer Devices"; Implementation Agreement: OIF-SPI4-02.1; SPI-4 Phase 2; Oct. 15, 2003; 61 pages.
"Meigs-II—1×10 Gigabit and 10×1 Gigabit Ethernet MAC Chip"; Vitesse; Advance Product Information; VSC7321 Data Sheet; Apr. 1, 2003; 227 pages.

* cited by examiner

*Primary Examiner*—Nittaya Juntima
*Assistant Examiner*—Mon Cheri S Davenport
(74) *Attorney, Agent, or Firm*—RG&Associates (57) ABSTRACT

An interface between a high speed data signal input and multiple lower speed data signal outputs is described. In one preferred embodiment, the interface comprises a receiver core for separating the high speed data signal into multiple independent channels with each channel having a different priority; an Interface Logic Unit comprising multiple interface logic subunits each for processing one of the multiple independent channels. Each of the interface logic subunits includes a separator for separating the individual channel into multiple intermediate signals; and feedback device for providing feedback to the receiver core regarding a condition of one or more of the multiple intermediate signals. The interface further includes multiple multiplexer with each receiving one of the multiple intermediate signals and multiplexing the received intermediate signals to create one of the multiple lower speed data signals.

28 Claims, 5 Drawing Sheets

FIG. 1

Prior Art

| FIFO Status | HASH Function Algorithm |
| --- | --- |
| 000 | Algorithm 0 |
| 001 | Algorithm 1 |
| 010 | Algorithm 2 |
| 011 | Algorithm 3 |
| 100 | Algorithm 4 |
| 101 | Algorithm 5 |
| 110 | Algorithm 6 |
| 111 | Algorithm 7 |

SYSTEM AND METHOD FOR IMPLEMENTING FLOW CONTROL WITH DYNAMIC LOAD BALANCING FOR SINGLE CHANNELIZED INPUT TO MULTIPLE OUTPUTS

BACKGROUND OF THE INVENTION

1. Technical Field of the Invention

The present invention generally relates to an interface between a single channelized input and multiple outputs. More particularly, and not by way of any limitation, the present invention is directed to system and method for implementing flow control with dynamic load balancing in such interfaces.

2. Description of Related Art

Figure 1:
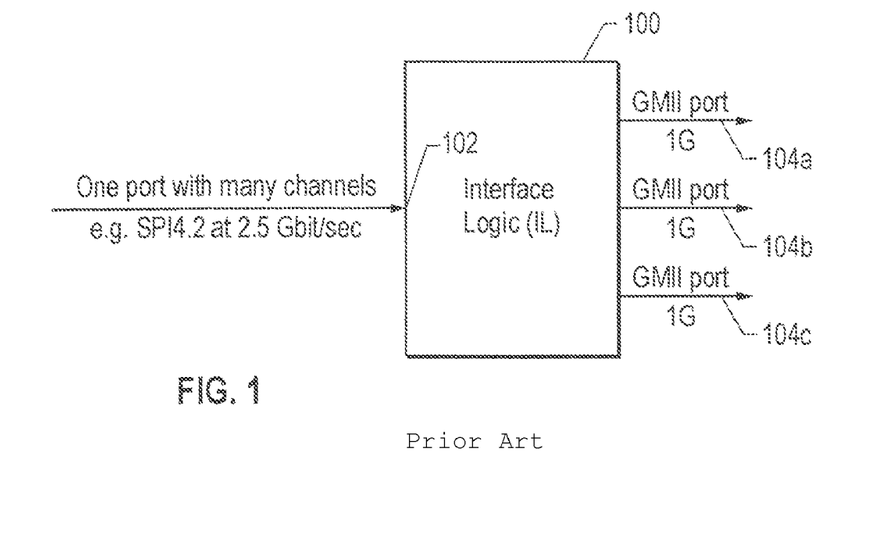
FIG. 1 illustrates a block diagram of an SPI4.2-to-GMII interface.

Currently, there exists an interface device for translating System Packet Interface level 4.2 ("SPI4.2") to Generic Media Independent Interface ("GMII"). A single channelized input, such as is the case with SPI4.2, means one input port (e.g., a SPI4.2 port) with many channels, where each channel might carry traffic of a particular priority. FIG. 1 illustrates interface logic ("IL") circuitry 100 for translating between a single channelized SPI4.2 input port 102 at 2.5 gigabits-per-second ("Gbps") and three GMII output ports 104a-104c at 1 Gbps each.

As illustrated in FIG. 1, an SPI4.2-to-GMII interface, such as the circuitry 100, requires flow control due to a rate mismatch between the 2.5 Gbps input and the 1 Gbps output. Without flow control, packets enter the IL circuitry 100 at a higher rate than can be siphoned out. Accordingly, packets or parts of packets are dropped without indication thereof being sent to the SPI4.2 input port 102. As a result, the GMII output ports 104a-104c may receive only a portion of a packet coming in from the input port 102. Corrupt data sent upstream could cause waste of resources, delays, and shutdown of the IL circuitry 100.

Additionally, an SPI4.2-to-GMII interface, such as the circuitry 100, requires load balancing amongst the GMII ports 104a-104c to ensure that traffic is equally distributed therebetween. Dynamic load balancing is required in the event that traffic to one of the GMII ports 104a-104c becomes excessive. Without dynamic load balancing, new incoming traffic flows would continue to be assigned to heavily loaded ports, resulting in inefficient use of resources and bandwidth waste.

Currently, there is no known mechanism for performing flow control with dynamic load balancing in protocol translation interfaces. One chipset, referred to herein as "Vitesse7321", maps SPI4.2 to GMII; however, each SPI4.2 channel is mapped to a single GMII port. Moreover, the Vitesse7321 does not implement true flow control. Rather, excess traffic coming in on the SPI4.2 channel, at rates beyond 1 Gbps, is dropped without sending any backpressure mechanism to the SPI4.2 interface. Additionally, designs that implement SPI4.2 to SPI3 bridges translate Quad SPI3 to SPI4.2; however, these do not require flow control because no rate mismatch is encountered. Also, it is known that problems such as these are commonly encountered in implementing other protocol translation interfaces in general.

SUMMARY OF THE INVENTION

One embodiment is an interface between a high speed data signal input and N lower speed data signal outputs. The interface comprises a receiver core for separating the high speed data signal into M channels each having a different priority; an Interface Logic Unit ("ILU") comprising M interface logic subunits each for processing one of the M channels. Each of the M interface logic subunits comprises means for separating the individual channel into N intermediate signals; and means for providing feedback to the receiver core regarding a condition of one or more of the N intermediate signals. The interface further comprises a multiplexer unit comprising N multiplexers ("MUXes") each receiving one of the N intermediate signals from each of the M interface logic subunits and multiplexing the received intermediate signals to create one of the N lower speed data signals.

Another embodiment is an interface between a high speed data signal input and N lower speed data signal outputs. The interface comprises receiver means for separating the high speed data signal into M channels each having a different priority and interface means comprising M subunits each for processing one of the M channels. Each of the M subunits comprises means for separating the individual channel into N intermediate signals; and means for providing feedback to the receiver means regarding a condition of one or more of the N intermediate signals. The interface further comprises N multiplexer ("MUX") means each for receiving one of the N intermediate signals from each of the M subunits and multiplexing the received intermediate signals to create one of the N lower speed data signals.

Yet another embodiment is a method of providing an interface between a high speed data signal input and N lower speed data signal outputs. The method comprises separating the high speed data signal into M channels each having a different priority; processing each of the M channels by separating the individual channel into N intermediate signals and providing feedback to a receiver core regarding a condition of one or more of the N intermediate signals; receiving at each of N multiplexers ("MUXes") one of the N intermediate signals from each of the M interface logic subunit means, wherein each of the received intermediate signals has a different priority; and multiplexing the received intermediate signals to create one of the N lower speed data signals.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

In the drawings, like or similar elements are designated with identical reference numerals throughout the several views thereof, and the various elements depicted are not necessarily drawn to scale.

Figure 2:
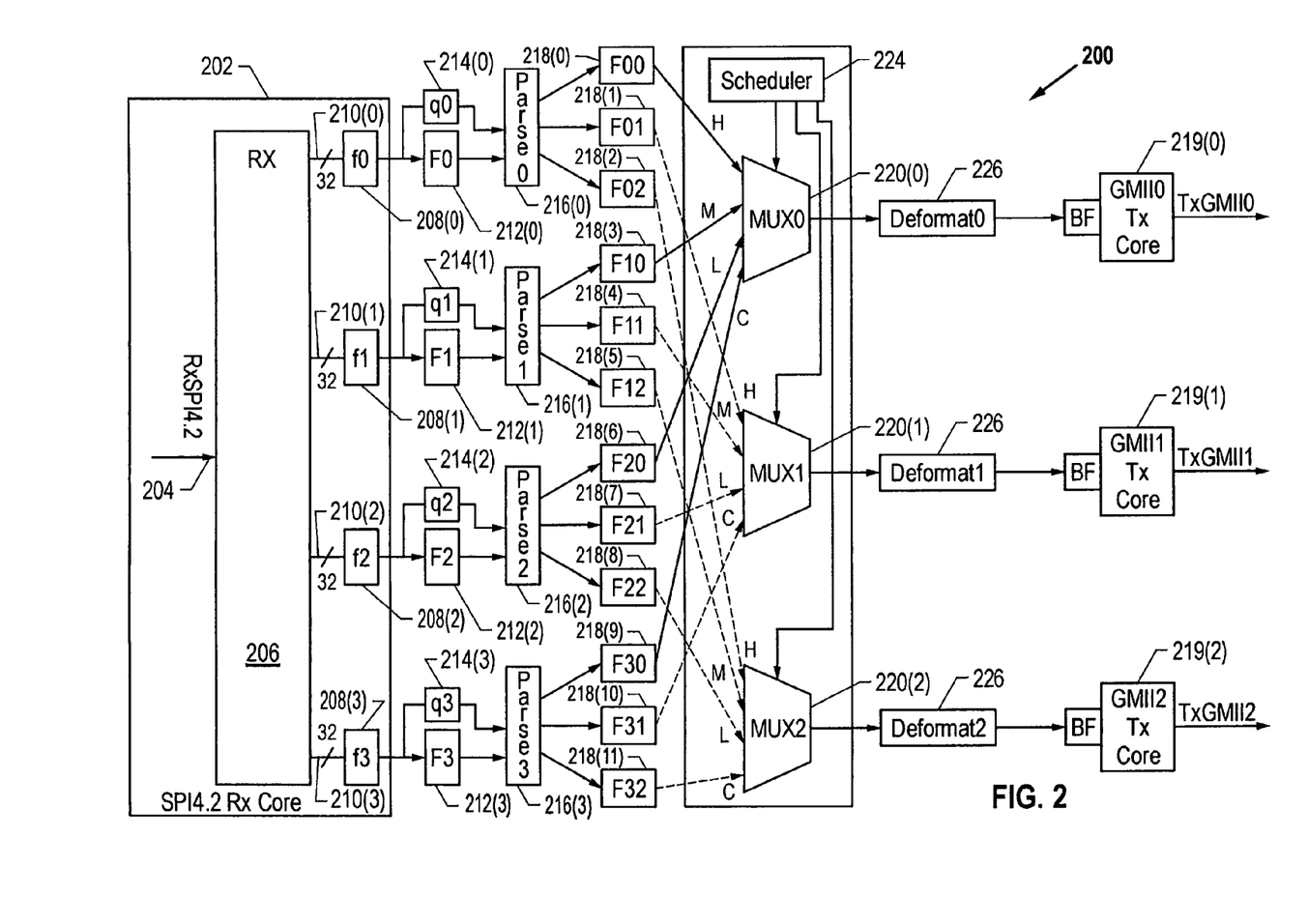
FIG. 2 illustrates a schematic block diagram of an SPI4.2-to-GMII interface in accordance with one embodiment.

For purposes of illustration herein, it will be assumed that SPI4.2 operates at a quarter rate (2.5 Gbps) and supports four priority traffic types, including High Priority ("H"), Medium Priority ("M"), Low Priority ("L"), and Control ("C"), on its channels. FIG. 2 illustrates a block diagram of an embodiment of IL circuitry 200 for accomplishing accomplish flow control and dynamic load balancing for a single channelized input to multiple outputs with minimal packet loss. In one embodiment, the IL circuitry 200 may be implemented on a Field Programmable Gate Array ("FPGA") or an Application Specific Integrated Circuit ("ASIC"), for example. As illustrated in FIG. 2, the circuitry 200 comprises a SPI4.2 Receiver ("Rx") Core 202 for receiving an SPI4.2 formatted data signal at a port 204. The Rx core 202 comprises an Rx module 206 and four FIFO 208(0)-208(3) through which four channels of data 210(0)-210(3) comprising the SPI4.2 data input the Rx core 202 are output from the core.

Each of the channels 210(0)-210(3) is input to a respective datapath FIFO 212(0)-212(3). Data may arrive at the FIFOs 212(0)-212(3) at a rate of up to 2.5 Gbps, but the FIFOs are emptied out at a rate of 1 Gbps, with excess data packets being dropped. Each FIFO 212(0)-212(3) has associated therewith a respective control FIFO 214(0)-214(3) for storing error and end-of-packet information about the packets in the respective datapath FIFO. The control FIFOs 214(0)-214(3) send this control information to a respective parser 216(0)-216(3). The control FIFOs 214(0)-214(3) do not hold data packets.

The parsers 216(0)-216(3) route packets to an appropriate one of a number of downstream datapath FIFOs 218(0)-218(11), based on the GMII destination within the packet. The parsers 216(0)-216(3) simply act as a demultiplexer; specifically, it routes each packet to a particular one of three GMII ports 219(0)-219(2), depending on the address contained therewithin. There are four parsers 216(0)-216(3), one for each of the four traffic priorities (H, M, L, and C). For the purposes of example and illustration herein, it will be assumed that the parser 216(0) is the H traffic parser, the parser 216(1) is the M traffic parser, the parser 216(2) is the L traffic parser, and the parser 216(3) is the C traffic parser.

There are three 4×1 multiplexers ("MUXes") 220(0)-220(2), each of which correspond to a GMII port 219(0)-219(2) destination. Each MUX 220(0)-220(0) multiplexes data with different traffic priorities received from four of the downstream FIFOs 218(0)-218(11) connected thereto and sends the multiplexed traffic to the corresponding one of the GMII ports 219(0)-219(2). A scheduler 224 controls the operation of each of the MUXes 220(0)-220(2). Since each of the MUXes 220(0)-220(2) takes out only one packet at a time from the downstream datapath FIFOs 218(0)-218(11), each MUX is effectively operating at 1 Gbps effective throughput. In contrast, all circuits upstream from the FIFOs 218(0)-218(11) operate at 2.5 Gbps or higher. Optional Deformat blocks 226 are used to implement functions not related to flow control.

Figure 3:
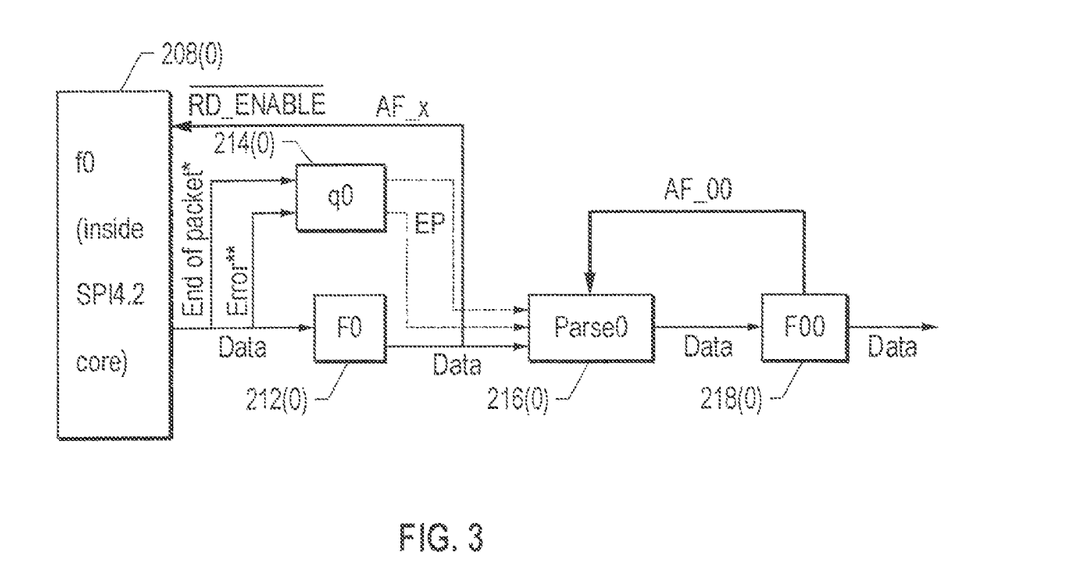
FIG. 3 illustrates one channel of the interface of FIG. 2 including circuitry for dropping errored packets.
Figure 4:
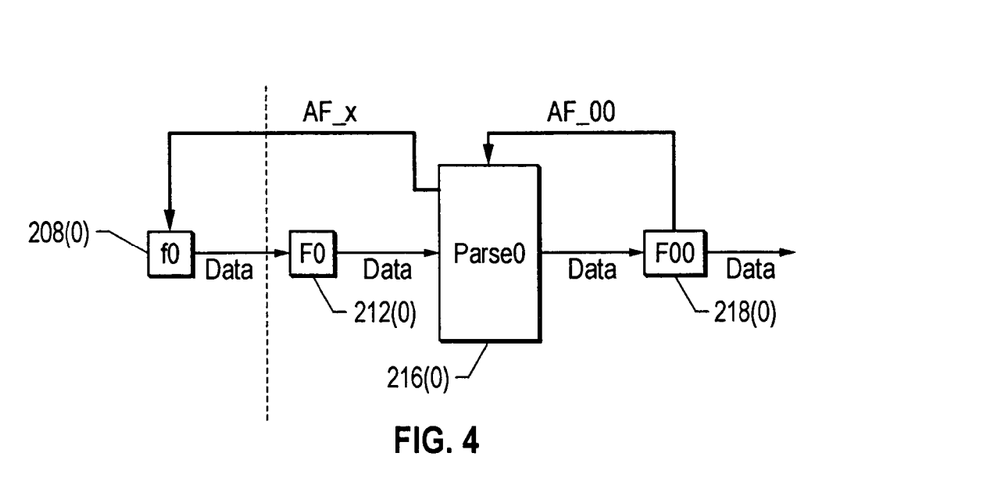
FIG. 4 illustrates one channel of the interface of FIG. 2 including circuitry for implementing flow control.

FIG. 3 illustrates a circuit for dropping errored packets. In FIG. 3, a first channel, comprising the FIFO 208(0), the datapath FIFO 212(0), the control FIFO 214(0), the parser 216 (0) and the downstream FIFO 218(0), is used to illustrate this feature; however, it will be recognized that identical operations are performed with respect to each of the four datapaths illustrated in FIG. 2. Referring to FIG. 3, the parser 216(0) determines whether to drop a packet, based on a signal "EP" from the control FIFO 214(0) regarding the existence of an errored packet or end-of-packet in the FIFO 212(0). FIGS. 3 and 4 illustrate implementation of flow control in the same datapath. As best illustrated in FIG. 4, the parser 216(0) receives a FIFO status feedback signal ("AF_00") from a downstream FIFO, such as the FIFO 218(0), and in turn sends a feedback signal AF_x to the corresponding FIFO 208(0) within the Rx core 202 (FIG. 2). No packets are lost, as a result of prompt signaling to the ingress SPI4.2.

Figure 5:
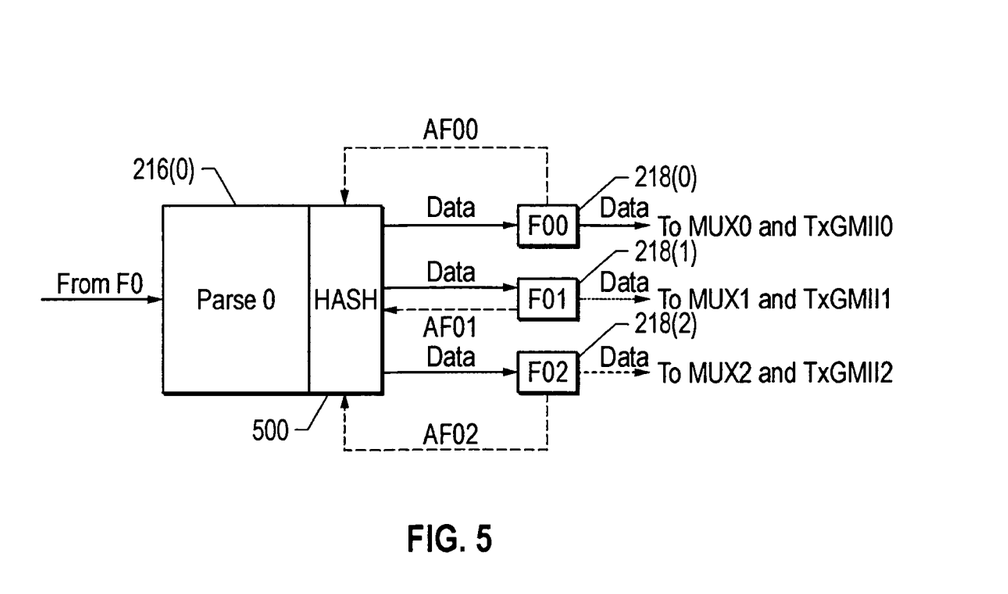
FIG. 5 illustrates one channel of the interface of FIG. 2 including circuitry for performing dynamic load balancing.

FIG. 5 illustrates implementation of a HASH function in each of the parsers 216(0)-216(3) for implementing a dynamic load balancing feature of one embodiment. In particular, the IL circuitry 200 is able to dynamically distribute new incoming traffic to lightly-loaded GMII ports 219(0)-219(2) to ensure equitable traffic distribution. To this end, a programmable HASH function 500 within the parser 216(0) receives feedback signals ("AF_00", "AF_01", and "AF_02") from downstream FIFOs (FIFOs 218(0), 218(1), and 218(2), respectively), to determine the appropriate algorithm for ensuring equitable traffic distribution to the ports 219(0)-219(1) at all times. Specifically, the AF_xx signal from a downstream FIFO 218(0)-218(11) will be 1 if the FIFO is almost full ("AF") and 0 if the FIFO is not AF.

More specifically, when a preset threshold in one of the downstream FIFOs 218 (0)-218 (11) is crossed, it is considered "FULL". Each downstream FIFO has two binary states, including FULL (1) and not FULL (0). With n FIFOs (one for each GMII port destination) per parser, there are $2^n$ combinations of FULL/not FULL status. Accordingly, $2^n$ hash algorithms are devised a priori and programmed into the HASH function 500 of the parser. These hash algorithms are devised to ensure equitable traffic distribution to all of the GMII ports 219(0)-219(2). In the embodiment illustrated in FIG. 5, depending on the status of the FIFOs 218(0)-218(2) obtained at periodic intervals, the appropriate algorithm for use as the HASH function 500 is selected from one of the $2^n$ hash algorithms and implemented to determine the assignment of new flows to a given GMII port. Details of the HASH function algorithms are implementation-specific.

Figure 6:
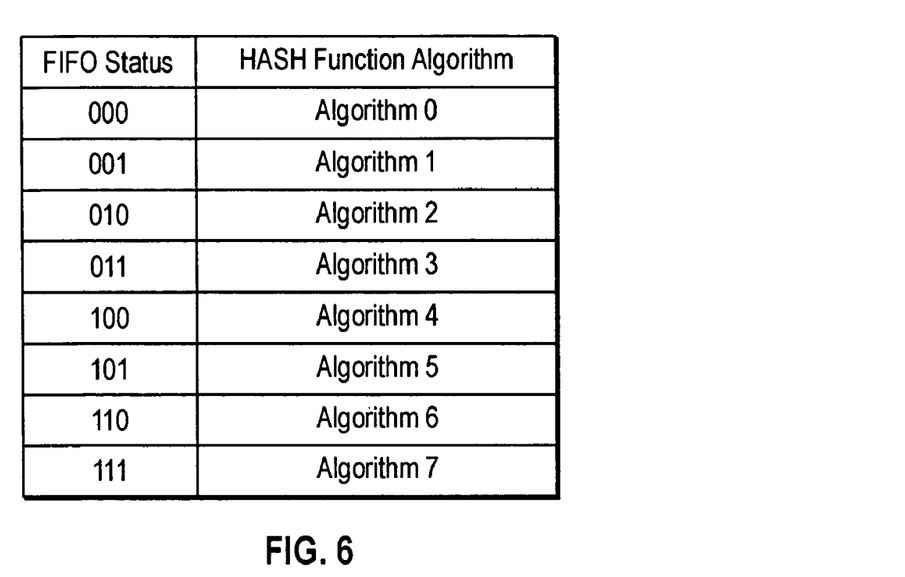
FIG. 6 illustrates a table of programmable HASH functions for implementation by the interface of FIG. 2.

FIG. 6 is a table 600 illustrating the concept described above with reference to FIG. 5. In the table 600, the three bit number in a FIFO Status column indicates the status of the FIFOs that correspond to the parser in which the hash function is implemented. In particular, for the HASH function 500, each entry in the FIFO Status column indicates the status of one of the three FIFOs (e.g., FIFOs 218(0)-218(2)) fed by the parser (e.g., the parser 216(0)). A FIFO Status of 000 corresponds to a condition in which all of the FIFOs 218(0)-218(2) are empty; a FIFO status of 111 corresponds to the condition in which all of the FIFOs 218(0)-218(2) are FULL. A FIFO Status of 001 corresponds to a condition in which the FIFOs 218(1) and 218(2) are NOT FULL and the FIFO 218 (0) is FULL. For each of the $2^n$ possible FIFO Status values, there is a corresponding Hash Algorithm, as indicated in the Hash Algorithm column of the table 600, that is executed to ensure load balancing for the corresponding parser.

Several different scenarios and the reaction of the IL circuitry 200 will now be considered in detail.

For example, in a first scenario ("Scenario 1"), as best illustrated in FIGS. 3 and 4, it will be assumed that nearly all of the packets from the SPI4.2 port 204, at rates of up to 2.5 Gbps, are transmitted to the FIFO 212(0) via the FIFO 208(0). If the FIFO 218(0) fills up, the parser 216(0) will receive an AF_00 signal from the FIFO 218(0), as illustrated in FIG. 3. The parser 216(0) will therefore read packets destined for the FIFO 218(0) and through the backpressure mechanism of the AF_x indication, the FIFO 208(0) will become full, which informs the network to stop sending traffic onto this channel. However, it will be noted that packets to all other parsers 216(1)-216(3) will go through, if there is any traffic destined to the other GMII ports.

A second scenario ("Scenario 2") illustrates a special case of flow control in which one of the GMII ports is left unconnected. In accordance with the features of one embodiment, in Scenario 2, traffic to other GMII ports is not blocked. In particular, referring to FIGS. 2 and 5, if the GMII port 219(0) is unconnected, then the FIFOs 218(0), 218(3), 218(6) and 218(9) will fill up because packets in these buffers are not being emptied by the port 219(0). The parser 216(0) will be notified concerning the "Almost Full" ("AF") status of the FIFO 218(0) by an AF_xx (i.e., AF_00) flag sent from the FIFO to the parser. The parser 216(0) then reads the packet destinations and selectively sends traffic to the FIFOs 218(1), 218(2), and not to the FIFO 218(0), by simply reading the packets and dropping those destined for the FIFO 218(0). Eventually, the FIFO 208(0) inside the Rx core 202 will fill up, causing the SPI4.2 to backpressure traffic to the network.

In this manner, traffic to other GMII ports 219(1), 219(2), will continue unimpeded. Thus, blocking of one GMII port will not cause traffic to the other GMII ports to be blocked; however, packets in the downstream datapath FIFOs corresponding to the port will be dropped. This results in some initial packet loss due to packets being sent to a GMII port when it cannot be emptied out.

In a third scenario ("Scenario 3"), errored packets are detected as follows. For purposes of example, it will be assumed that an errored packet arrives at the end of the packet in the FIFO 212(0). The goal is to minimize the processing of such errored packets, since the processing results in wasted computational effort on a packet that will eventually be dropped. As best illustrated in FIG. 3, the insertion of a control FIFO 214(0) along with the datapath FIFO helps minimize the processing of errored packets. In particular, packets are queued into the FIFO 212(0), which will detect that the packet is errored. This information is signaled via the EP signal to the parser 216(0) via the control FIFO 214(0). The control FIFO 214(0) is in the control path and simply keeps track of which packets are errored, as well as the end-of-packet.

Accordingly, the parser 216(0) will be informed as to which packets it reads from the FIFO 212(0) are errored and simply drops all such packets. In this manner, bandwidth is not wasted at the MUXes 220(0)-220(2) in reading errored packets, resulting in more efficient multiplexing.

A fourth scenario ("Scenario 4"), shown in FIG. 5, illustrates use of an embodiment to perform dynamic load balancing across multiple GMII ports. Load balancing across multiple GMII ports can be achieved by implementing a hash function inside the parser to distribute traffic evenly across all GMII ports without requiring any major architectural changes.

It will be recognized that once a particular flow is assigned to a certain GMII port, it will remain there until the flow is terminated. Additionally, when a chipset containing the IL circuitry is first powered up, the HASH function 500 distributes traffic evenly to all three GMII ports 219(0)-219(3). With static load balancing, the algorithm for the HASH function 500 remains the same regardless of the feedback AF00, AF01, AF02 received from the downstream FIFOs 218(0)-218(11). For dynamic load balancing, the HASH function 500 will include a function where it periodically gauges the buffer occupancy of the FIFOs 218 (0)-218 (11) to determine where one or more GMII ports 219(0)-219(2) is heavily or lightly loaded. Accordingly, newer incoming traffic flows will be assigned to those GMII ports that are the least heavily loaded. This is accomplished by appropriate selection of on of the $2^n$ algorithms programmed a priori into the chipset, as mentioned above.

Figure 7:
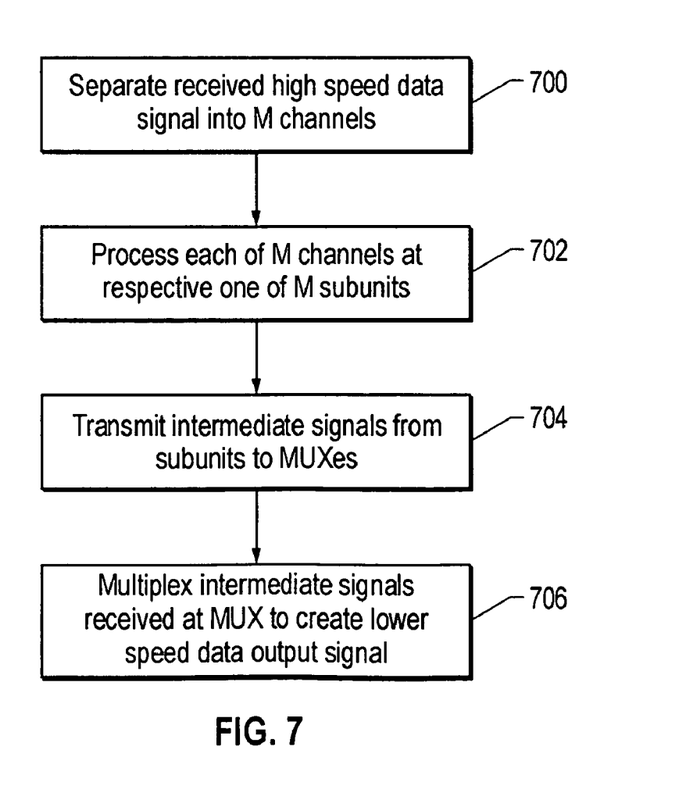
FIG. 7 illustrates a flowchart of the operation of an embodiment of the interface of FIG. 2.

FIG. 7 illustrates a flowchart of the operation of an embodiment of the IL 200. In step 700, a high speed data signal, in this case, an SPI4.2 signal, received at the receiver core is separated into M channels, wherein each of the M channels has a different priority. In the embodiments illustrated herein, M is equal to four. In step 702, each of the M channels is processed at respective one of M interface logic subunits. Referring to FIG. 2, a first interface logic subunit comprises the FIFO 212(0), the parser 216(0), the control FIFO 214(0), and the downstream FIFOs 218(0)-218(2). Similarly, a second interface logic subunit comprises the FIFO 212(1), the parser 216(1), the control FIFO 214 (1), and the downstream FIFOs 218(3)-218(5); a third interface logic subunit comprises the FIFO 212(2), the parser 216(2), the control FIFO 214(2), and the downstream FIFOs 218(6)-218(8); and a fourth interface logic subunit comprises the FIFO 212(3), the parser 216(3), the control FIFO 214(3), and the downstream FIFOs 218(9)-218(11).

Referring again to FIG. 7, the processing that occurs in step 702 includes separating the received channel into N intermediate signals and providing feedback to the receiver core regarding a condition of one or more of the N intermediate signals. It will be recognized that N is equal to the number of lower speed data signal outputs. In the embodiments illustrated herein, N is equal to three. In step 704, each of the N intermediate signals from each of the M interface logic subunits is transmitted to one of N multiplexers. As illustrated in FIG. 2, all of the intermediate signals received at each MUX will be of a different priority. In step 706, at each MUX, the received intermediate signals are multiplexed to create one of the N GMII output data signals. In step 708, the N GMII output data signals are output via a respective port 219(0)-219(2).

Figure 8:
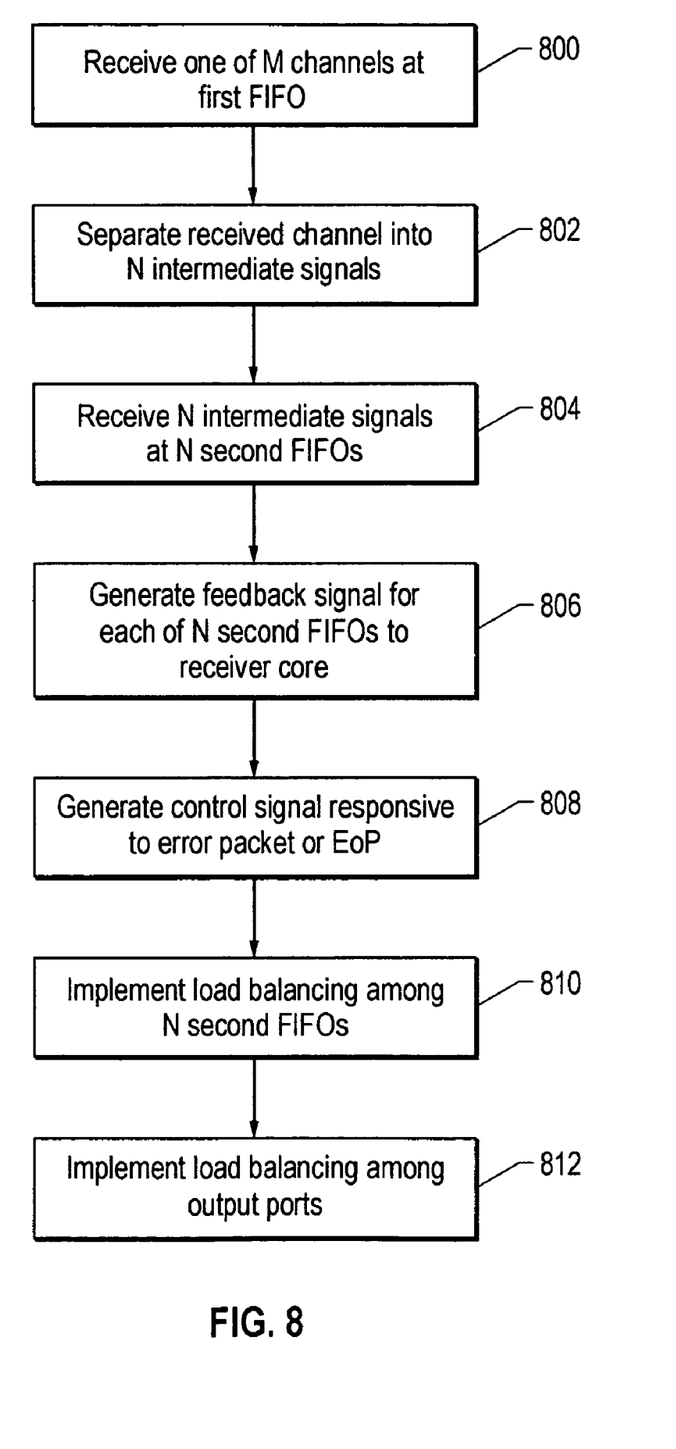
FIG. 8 illustrates a flowchart of the operation of an interface logic subunit of the an embodiment of the interface of FIG. 2.

FIG. 8 is a flowchart illustrating operation of each of the interface logic subunits described above. The first subunit comprising the FIFO 208(0), the FIFO 212(0), the parser 216(0), and the control FIFO 214(0) will be used as an example, it being recognized that all of the subunits operate in identical fashion. In step 800, the subunit receives one of the M channels at the first FIFO 212(0). In step 802, the parser 216(0) of the subunit separates the received channel into N intermediate signals. In step 804, each of the N intermediate signals are received at a respective one of N second FIFOs 218(0), 218(2), 218(2), of the subunit. In step 806, for each of the N second FIFOs, a feedback signal indicative of a status (i.e., FULL or NOT FULL) of that FIFO is generated to the receiver core 202.

In step 808, a control signal is generated by the control FIFO 214(0) in response to an error packet or end of packet in the first FIFO 212(0). In step 810, load balancing is implemented among the N second FIFOs 218(0)-218(2) in response to the feedback signal. In step 812, the receiver core 202 is signaled to implement load balancing between the GMII data signal outputs 219(0)-219(2).

The embodiments described herein comprise an SPI4.2-to-GMII interface that provides a flow control mechanism that supports multiple traffic priorities and results in minimal packet loss. In addition, if one of the GMII ports is left unconnected, traffic to all other GMII ports remain unblocked. Errored packets (e.g., packets with bad CRCs) do not result in wasteful computation. The architecture allows for dynamic load balancing across multiple GMII ports. The principles of these embodiments are illustrated through application to a SPI4.2-to-GMII interface, although it will be recognized that these principles may also be applied to any two protocols that require flow control with an additional option of dynamic load balancing. The flow control mechanism is independent of the load balancing mechanism. The IL circuitry described herein provides both these sets of features, each of which may operate independently of each other.

It is believed that the operation and construction of the present invention will be apparent from the Detailed Description set forth above. While the exemplary embodiments of the invention shown and described may have been characterized as being preferred, it should be readily understood that various changes and modifications could be made therein without departing from the scope of the present invention as set forth in the following claims.

What is claimed is:

1. An interface between a data signal input and N data signal outputs, the interface comprising:
    a receiver core for separating the data signal input into M individual channels each channel having a different priority for each N data signal output having a different rate and different priority;
    an Interface Logic Unit ("ILU") comprising M interface logic subunits each for processing one of the M individual channels and each comprising:
        means for separating at least one of the M individual channels into N intermediate signals;
        means for providing feedback to the receiver core regarding a condition of one or more of the N intermediate signals;
        means for generating control signals responsive to an error packet or an end of packet in one or more of the M individual channels;
        means for implementing load balancing among one or more of the N intermediate signals;
        means for implementing load balancing among the N data signal outputs; and
    a multiplexer unit comprising N multiplexers ("MUXes") each receiving one of the N intermediate signals from each of M interface logic subunits and multiplexing the received intermediate signals to create one of the N lower speed data signals.

2. The interface of claim 1 wherein each of the intermediate signals received at a MUX has a different priority.

3. The interface of claim 1 wherein the priority of the at least one of the M individual channels is selected from a group consisting of a first priority, a second priority, a third priority, and a fourth priority.

4. The interface of claim 1 wherein the feedback to the receiver core regards whether one or more of the N intermediate signals needs flow control.

5. The interface of claim 1 wherein the feedback to the receiver core regards whether a need exists to implement a dynamic load balancing between the N intermediate signals and the M individual channels.

6. The interface of claim 1 wherein each of the M interface logic subunits comprises:
    a first FIFO that receives one of the M individual channels; and
    N FIFOs for each receiving one of the N intermediate signals and providing a feedback signal to the means for separating on a status of at least one of the N FIFO as FULL or NOT FULL wherein the parser implement load balancing between the N FIFOs in response to the feedback signal and signals the receiver core to implement load balancing between the N lower speed data signal outputs.

7. The interface of claim 6 wherein the means for separating comprises a HASH function for implementing load balancing between the N FIFOs, the HASH function for implementing a HASH algorithm selected from a plurality of HASH algorithms based on the status of the N FIFOs.

8. The interface of claim 6 wherein each of the interface logic subunits further comprises:
    a control FIFO connected to the input of the first FIFO and to the means for separating, wherein the control FIFO provides a signal to the means for separating in response to an error packet or end-of-packet in the first FIFO; and
    wherein the parser drops a packet in response to receipt of the signal from the control FIFO.

9. The interface of claim 8 wherein each of the N MUXes prioritizes receipt and output of the N intermediate signals from the interface logic subunits by priority of the M channels to the different interface logic subunits.

10. An interface between a data signal input and N data signal outputs, the interface comprising:
    receiver means for separating the data signal input into M individual channels each channel having a different priority for each N data signal output having a different rate and different priority;
    interface means comprising M subunits each for processing one of the M individual channels and each comprising:
        means for separating at least one of the M individual channels into N intermediate signals;
        means for providing feedback to the receiver means regarding a condition of one or more of the N intermediate signals;
        means for generating control signals responsive to an error packet or an end of packet in one the at least of the M individual channels;
        means for implementing load balancing among one or more of the N intermediate signals;
        means for implementing load balancing among the N data signal outputs by the receiver means; and
    N multiplexer ("MUX") means each for receiving one of the N intermediate signals from each of the M subunits and multiplexing the received intermediate signals to create one of the N lower speed data signals.

11. The interface of claim 10 wherein each of the intermediate signals received at one of the N MUX means has a different priority.

12. The interface of claim 10 wherein the priority of the at least one of the M individual channels is selected from a group consisting of a first priority, a second priority, a third priority, and a fourth priority.

13. The interface of claim 10 wherein the feedback to the receiver means indicates whether one or more of the N intermediate signals needs flow control.

14. The interface of claim 10 wherein the feedback to the receiver means indicates whether a need exists to implement a dynamic load balancing between the N intermediate signals and the M individual channels.

15. The interface of claim 10 wherein each of the M subunits comprises:
    first means for receiving the at least one of the M individual channels;
    N second means each for receiving one of the N intermediate signals and providing a feedback signal to the means for separating concerning a status of the at least one of the N second means for receiving as FULL or NOT FULL;
    control means connected to the input of the first means for receiving and to the means for separating, for providing a signal to the means for separating in response to an error packet or end-of-packet in the first means; and.

16. The interface of claim 15 wherein the means for separating comprises means for implementing a HASH algorithm for implementing load balancing between the N second means for receiving, wherein the HASH algorithm is selected from a plurality of HASH algorithms based on the status of the N second means for receiving.

17. The interface of claim 15 wherein the first means for receiving comprises a FIFO.

18. The interface of claim 15 wherein the means for separating comprises a parser.

19. The interface of claim 15 wherein each of the N second means for receiving comprises a FIFO.

20. The interface of claim 15 wherein the control means comprises a control FIFO.

21. The interface of claim 15 wherein the means for separating drops a packet in response to receipt of the signal from the control means.

22. A method of providing an interface between a data signal input and N data signal outputs, the method comprising:
   separating the data signal input into M individual channels each channel having a different priority for each N data signal output having a different rate and different priority;
   processing each of the M individual channels by:
      separating at least one of M individual channels into N intermediate signals; and
      providing feedback to a receiver core regarding a condition of one or more of the N intermediate signals;
   receiving at each of N multiplexers ("MUXes") one of the N intermediate signals from each of M interface logic subunit means, wherein each of the received intermediate signals has a different priority;
   generating control signals responsive to an error packet or an end of packet in one or more of the M individual channels;
   implementing load balancing among one or more of the N intermediate signals;
   implementing load balancing among the N data signal outputs; and
   multiplexing the received intermediate signals to create one of the N lower speed data signals.

23. The method of claim 22 further comprising:
   providing feedback to the receiver core indicative of whether one or more of the N intermediate signals needs flow control.

24. The method of claim 22 further comprising:
   providing feedback to the receiver core indicative of whether a need exists to implement a dynamic load balancing between the N intermediate signals and the M individual channels.

25. The method of claim 22 wherein the processing each of the M interface logic subunit comprises:
   receiving at least one of the M channels at a first FIFO;
   receiving one of the N intermediate signals at one of N second FIFOs and generating a feedback signal indicative of a status of at least one of the N second FIFOs for receiving as FULL or NOT FULL;
   generating a control signal in response to an error packet or end-of-packet in the first FIFO;
   implementing load balancing between N second FIFOs second means for receiving in response to the feedback signal; and
   signaling the receiver core to implement load balancing between N lower speed data signal outputs.

26. The method of claim 25 further comprising wherein the implementing load balancing comprises executing a HASH algorithm selected from a plurality of HASH algorithms based on the status of the N second FIFOs.

27. The method of claim 25 further comprising dropping a packet in response to receipt of the control signal.

28. The method of claim 27 further comprising prioritizing receipt and output of the N intermediate signals by priority of the corresponding M individual channels.

* * * * *